C. BURTON & R. GARDNER.
CLUTCH FOR ENGINE STARTERS.
APPLICATION FILED AUG. 10, 1911.
1,042,887.
Patented Oct. 29, 1912.
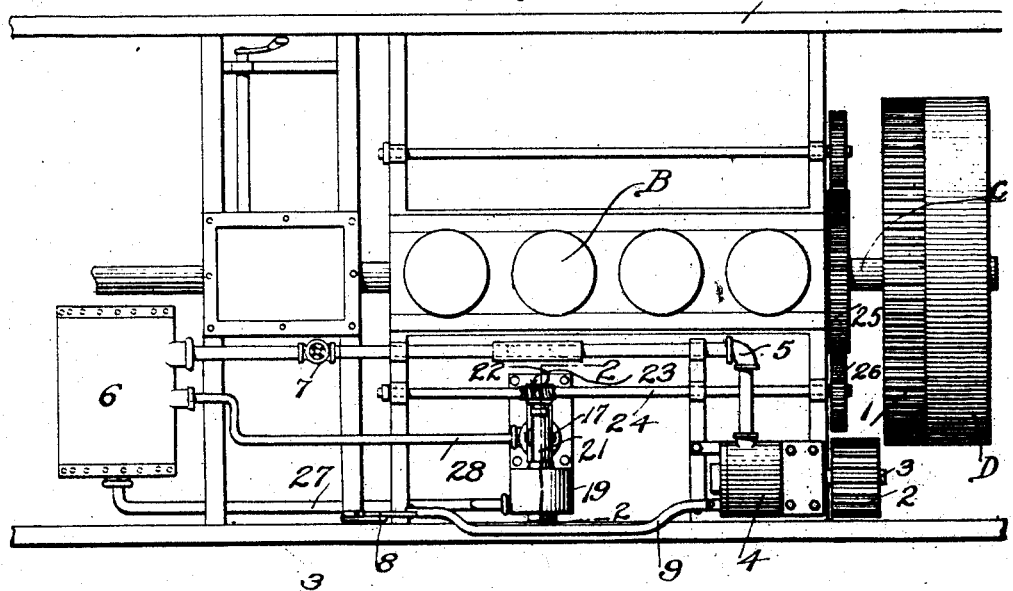
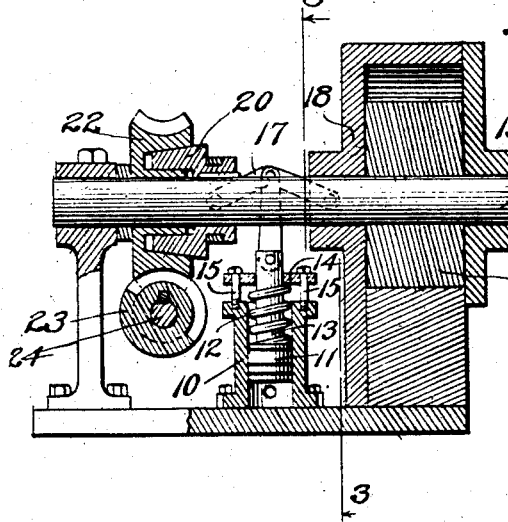
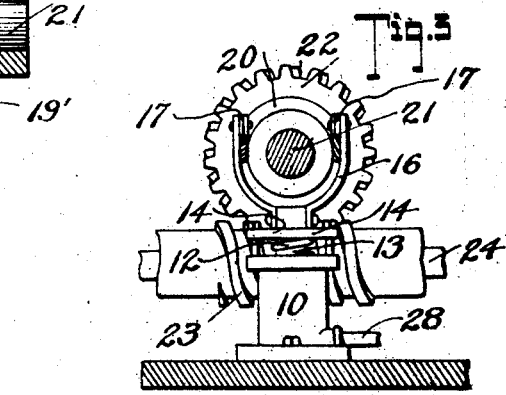
WITNESSES:
Charles H Wagner
E Larson
INVENTORS.
C. Burton
R. Gardner
BY
Attorneys

UNITED STATES PATENT OFFICE.

CHARLES BURTON AND RIO GARDNER, OF NEW YORK, N. Y.

CLUTCH FOR ENGINE-STARTERS.

1,042,887.   Specification of Letters Patent.   Patented Oct. 29, 1912.

Application filed August 10, 1911. Serial No. 643,812.

*To all whom it may concern:*

Be it known that we, CHARLES BURTON and RIO GARDNER, citizens of the United States, residing at New York, in the county of New York and State of New York, have invented certain new and useful Improvements in Clutches for Engine-Starters, of which the following is a specification.

The present invention consists of improvements in clutches for use with engine starters and is preferably designed for use in connection with automobiles or motor vehicles employing explosive motors.

The invention consists in a clutch adapted to be thrown in and out of an operative position by a piston operated in a cylinder by compressed air, the latter being supplied from a reservoir which is charged by a pump operated by the motor of the automobile or vehicle when the pressure in the reservoir is below a certain point.

For a full understanding of the present invention reference is to be had to the following description and to the accompanying drawings, in which—

Figure 1 is a fragmentary plan view of the chassis of an automobile showing the invention applied thereto; Fig. 2 is a sectional view taken about on the line 2—2 of Fig. 1; Fig. 3 is a fragmentary sectional view taken about on the line 3—3 of Fig. 2.

Throughout the following detail description and on the several figures of the drawings, similar parts are referred to by like reference characters.

In the drawings, A denotes the chassis of an ordinary motor vehicle, B the explosive motor, C the engine shaft and D the fly-wheel, said parts being of the ordinary conventional construction. The fly-wheel D may be located at any suitable place with respect to the chassis A, its position varying in different types of automobiles.

Associated with the fly-wheel D and preferably mounted upon the engine shaft C is a large spur gear 1 adapted to be engaged by a pinion 2 carried by a shaft 3. The shaft 3 is adapted to be driven by means of any conventional type of auxiliary fluid motor, shown at 4, said motor 4 being connected by a pipe 5 with the air reservoir 6. A valve 7, located in any position to be conveniently controlled by the operator, is designed to control the passage of the fluid medium from the reservoir 6 to the auxiliary motor 4. The motor 4, furthermore, is slidably mounted upon a portion of the frame-work of the chassis A, and is movable longitudinally of the latter by means of a lever 8 connected thereto by a rod 9. Normally the auxiliary motor 4 is so arranged that the pinion 2 is not in mesh with the gear 1, but when it is desired to start the main engine B, it is apparent that it is only necessary to operate the lever 8 so as to move the motor 4 a sufficient distance to carry the pinion 2 into engagement with the gear 1, after which the valve 7 may be opened so as to admit air from the reservoir 6 to the casing of the motor 4, whereupon the latter will be operated to transmit motion through the gear 1 to the engine shaft C and fly-wheel D. Once the engine B is started, its operation will be maintained by the usual explosive medium supplied to the cylinders of said engine.

The present invention relates primarily to the provision of controlling means for automatically maintaining a predetermined amount of air under pressure in the reservoir 6, said means consisting, primarily, of a regulator comprising a cylinder 10 in which is mounted a piston 11 normally held in a position adjacent to the lower end of the cylinder 10 by means of a coiled spring 12. The spring 12 encircles the rod 13 of the piston 11 and bears at one end against the upper side of the piston and at its opposite end against the under side of an adjustable plate 14 secured to the upper end portion of the cylinder 10. The fastening bolts 15 permit of desired adjustment of the plate 14 to either increase or decrease the tension of the spring 12, as may be desired. At its upper end the piston rod 13 carries a yoke 16 which is connected to the members of a toggle joint 17 at the point of connection of said members, one member of the toggle joint being pivoted to the casing 18 of a rotary pump 19 and the other member of the joint 17 being connected to a clutch member 20 splined to the shaft 21 which carries the piston 19' of said pump 19. The clutch member 20 is of circular form and coöperates with a groove or annular recess in a worm-wheel 22 which is loosely mounted upon the shaft 21 and in engagement with a worm 23. The worm 23 is carried by a shaft 24 arranged parallel with the engine shaft C and connected with the latter by the intermeshing gears 25 and 26.

Leading from the casing 18 of the pump 19 is an air pipe 27 which is connected to the reservoir 6, and another air pipe 28 leads from the reservoir to the lower end of the cylinder 10.

Having in view the foregoing arrangement of parts, it will be apparent that when the pressure medium in the reservoir is utilized so as to lower the pressure in the latter beyond a predetermined point, the pressure against the under side of the piston 11 is correspondingly lowered because the cylinder 10 is in communication with the reservoir 6. On lowering of the pressure in the reservoir 6, as above described, the piston 11 moves downwardly exerting a downward pull on the yoke 16 and tending to move the members of the joint 17 into an alined position. Such movement forces the clutch member 20 into frictional engagement with the worm-wheel 22, whereupon the shaft 21 is connected operatively with the worm wheel and caused to rotate by reason of the motion which is imparted from the drive shaft 24. Through the shaft 21, the piston 19' of the pump 19 will be operated and air will be forced from the pump to the reservoir 6 to replenish the supply in the latter. When the pressure in the reservoir 6 has been restored to a predetermined point, the piston 11 is thus moved upwardly against the tension of the spring 12, correspondingly actuating the members of the toggle joint 17 and withdrawing the clutch member 20 from operative engagement with the worm-wheel 22, thereby discontinuing the operation of the pump 19.

Having thus described the invention, what is claimed as new is:

In combination, a shaft, a wheel on the shaft, a clutch member carried by the shaft and adapted to engage the wheel to operably connect the latter to the shaft, a stationary member, a toggle lever connected at one end to the stationary member and at the opposite end to the clutch member for moving the latter into and out of engagement with the wheel, a cylinder, a piston operable in the cylinder, a piston rod, a spring carried by the piston, an adjustably mounted plate to regulate the tension of the spring, means connecting the piston rod to the toggle lever, and means for operating the piston.

In testimony whereof we affix our signatures in presence of two witnesses.

CHARLES BURTON.
RIO GARDNER.

Witnesses:
CHARLES H. DAVIS,
FRANK E. FARRELL.